(12) United States Patent
Dornik et al.

(10) Patent No.: US 12,228,159 B2
(45) Date of Patent: Feb. 18, 2025

(54) FLOW DRILL SCREW AND TIP CONFIGURATION

(71) Applicants: Ford Global Technologies, LLC, Dearborn, MI (US); Semblex Corporation, Elmhurst, IL (US)

(72) Inventors: Nicholas Dornik, Canton, MI (US); Amanda Kay Freis, Ann Arbor, MI (US); Garret Sankey Huff, Ann Arbor, MI (US); Brandt J. Ruszkiewicz, Cumming, GA (US); Stephen J. Crockett, Bartlett, IL (US)

(73) Assignees: Ford Global Technologies, LLC, Dearborn, MI (US); Semblex Corporation, Elmhurst, IL (US)

( * ) Notice: Subject to any disclaimer, the term of this patent is extended or adjusted under 35 U.S.C. 154(b) by 186 days.

(21) Appl. No.: 18/168,280

(22) Filed: Feb. 13, 2023

(65) Prior Publication Data
US 2024/0271653 A1    Aug. 15, 2024

(51) Int. Cl.
*F16B 25/00* (2006.01)
*F16B 25/10* (2006.01)

(52) U.S. Cl.
CPC ........ *F16B 25/0084* (2013.01); *F16B 25/106* (2013.01); *F16B 25/00* (2013.01)

(58) Field of Classification Search
CPC .... F16B 5/0275; F16B 25/00; F16B 25/0021; F16B 25/0031; F16B 25/0057; F16B 25/0078; F16B 25/0084; F16B 25/10; F16B 25/106; F16B 33/06; F16B 35/041

USPC .............. 411/378, 386, 387.2, 411, 424, 426
See application file for complete search history.

(56) References Cited

U.S. PATENT DOCUMENTS

| | | | |
|---|---|---|---|
| 3,156,152 A * | 11/1964 | Groezinger | F16B 25/0021 411/394 |
| 8,348,572 B2 | 1/2013 | Friederich et al. | |
| 8,939,692 B2 * | 1/2015 | Werthwein | F16B 25/106 411/386 |
| 9,151,307 B2 | 10/2015 | Freis | |
| 10,138,921 B2 | 11/2018 | Miller et al. | |
| 10,156,251 B2 | 12/2018 | Freis et al. | |
| 10,508,676 B2 * | 12/2019 | Miller | F16B 15/06 |
| 10,550,874 B2 * | 2/2020 | Groezinger | F16B 19/14 |

(Continued)

FOREIGN PATENT DOCUMENTS

DE    102012215901    5/2014
KR    1020090033360    4/2009

*Primary Examiner* — Roberta S Delisle
(74) *Attorney, Agent, or Firm* — Burris Law, PLLC

(57) ABSTRACT

A screw includes a head portion, an externally threaded shank extending from the head portion, the externally threaded shank having an external surface, and a flow-hole-forming tip disposed at a distal end portion of the externally threaded shank. The flow-hole-forming tip includes a radiused lower zone having an external surface tangent to the external surface of the externally threaded shank, a conical middle zone having an external surface tangent to the external surface of the radiused lower zone, the conical middle zone defining a vertex angle, and a radiused distal end zone having an external surface tangent to the external surface of the conical middle zone. The flow-hole-forming tip includes a width of the flow-hole-forming tip is greater than a length of the flow-hole-forming tip and/or the vertex angle is greater than or equal to 90 degrees.

20 Claims, 4 Drawing Sheets

(56) References Cited

U.S. PATENT DOCUMENTS

| | | | |
|---|---|---|---|
| 11,156,248 B2 | 10/2021 | Vogel et al. | |
| 2006/0137166 A1* | 6/2006 | Babej | F16B 37/065 |
| | | | 411/181 |
| 2008/0222873 A1* | 9/2008 | Draht | F16B 19/14 |
| | | | 29/432 |
| 2011/0289752 A1* | 12/2011 | Werthwein | F16B 25/106 |
| | | | 411/386 |
| 2012/0107070 A1* | 5/2012 | Bongartz | F16B 25/106 |
| | | | 411/378 |
| 2015/0101458 A1* | 4/2015 | Saje | F16B 35/06 |
| | | | 411/401 |
| 2017/0045074 A1* | 2/2017 | Kulzer | F16B 41/002 |

* cited by examiner

FLOW DRILL SCREW AND TIP CONFIGURATION

FIELD

The present disclosure relates generally to fasteners and more particularly to flow drill screw (FDS) type fasteners, which are often used in joining adjacent workpieces with one-sided access.

BACKGROUND

The statements in this section merely provide background information related to the present disclosure and may not constitute prior art.

A variety of structures being joined often require one-sided joining techniques in order to create efficient assemblies. One such technique for one-sided joining is flow-drill screwing, in which a threaded fastener (or FDS) is installed into a joint and a "nut" or "bushing" is created within one of the workpieces of the joint in situ during the installation process.

In automotive structures, castings are increasingly being introduced into body structures to reduce part count and decrease assembly time. However, when FDS fasteners are used with these castings, the quality of the bushing can be more inconsistent than with traditional body structure materials fabricated by different processes (e.g., sheet metal and extrusions). A lower quality bushing will reduce thread engagement and can result in an improper installation, which can lead to reduced joint strength and corrosion concerns.

These issues related to the use of FDS type fasteners with structural castings, among other issues related to FDS installations and assemblies, are addressed by the present disclosure.

SUMMARY

This section provides a general summary of the disclosure and is not a comprehensive disclosure of its full scope or all of its features.

In one form of the present disclosure, a screw is provided that comprises a head portion, an externally threaded shank extending from the head portion, the externally threaded shank having an external surface, and a flow-hole-forming tip disposed at a distal end portion of the externally threaded shank. The flow-hole-forming tip comprises a radiused lower zone having an external surface tangent to the external surface of the externally threaded shank, a conical middle zone having an external surface tangent to the external surface of the radiused lower zone, the conical middle zone defining a vertex angle, and a radiused distal end zone having an external surface tangent to the external surface of the conical middle zone. The flow-hole-forming tip comprises at least one of: a width of the flow-hole-forming tip is greater than a length of the flow-hole-forming tip; and the vertex angle is greater than or equal to 90 degrees.

In variations of this screw, which may be implemented individually or in any combination: the radiused distal end zone has a radius of about 0.5 mm; the width of the flow-hole-forming tip is at least 1.25 times the length of the flow-hole-forming tip; a radius of the radiused lower zone is at least 4 times greater than a radius of the radiused distal end zone; the flow-hole-forming tip does not include a cutting edge; the radiused distal end zone defines a surface roughness (Ra) greater than a surface roughness of the radiused lower zone; the externally threaded shank comprises multi-helix threads; and the flow-hole-forming tip further comprises a friction coating.

In another form of the present disclosure, a screw is provided that comprises a head portion, an externally threaded shank extending from the head portion, the externally threaded shank having an external surface, and a flow-hole-forming tip disposed at a distal end portion of the externally threaded shank. The flow-hole-forming tip comprises a radiused lower zone having an external surface tangent to the external surface of the externally threaded shank, a conical middle zone having an external surface tangent to the external surface of the radiused lower zone, the conical middle zone defining a vertex angle greater than or equal to 90 degrees, and a radiused distal end zone having an external surface tangent to the external surface of the conical middle zone.

In variations of this screw, which may be implemented individually or in any combination: the radiused distal end zone defines a surface roughness (Ra) greater than a surface roughness of the radiused lower zone; a width of the flow-hole-forming tip is greater than a length of the flow-hole-forming tip; and the flow-hole-forming tip does not include a cutting edge.

In still another form of the present disclosure, a structural assembly is provided that comprises a plurality of workpieces, at least one of the workpieces comprising a casting, and a screw disposed between the plurality of workpieces. The screw comprises a head portion, an externally threaded shank extending from the head portion, the externally threaded shank having an external surface, and a flow-hole-forming tip disposed at a distal end portion of the externally threaded shank. The flow-hole-forming tip comprises a radiused lower zone having an external surface tangent to the external surface of the externally threaded shank, a conical middle zone having an external surface tangent to the external surface of the radiused lower zone, the conical middle zone defining a vertex angle greater than or equal to 90 degrees, and a radiused distal end zone having an external surface tangent to the external surface of the conical middle zone.

In variations of this structural assembly, which may be implemented individually or in any combination: the casting is one of an aluminum material or a magnesium material; the casting is a 7xxx series aluminum material; a width of the flow-hole-forming tip is greater than a length of the flow-hole-forming tip, and the width of the flow-hole-forming tip is at least 1.25 times the length of the flow-hole-forming tip; a radius of the radiused lower zone is at least 4 times greater than a radius of the radiused distal end zone; the flow-hole-forming tip does not include a cutting edge; the radiused distal end zone defines a surface roughness (Ra) greater than a surface roughness of the radiused lower zone; and the flow-hole-forming tip further comprises a friction coating.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
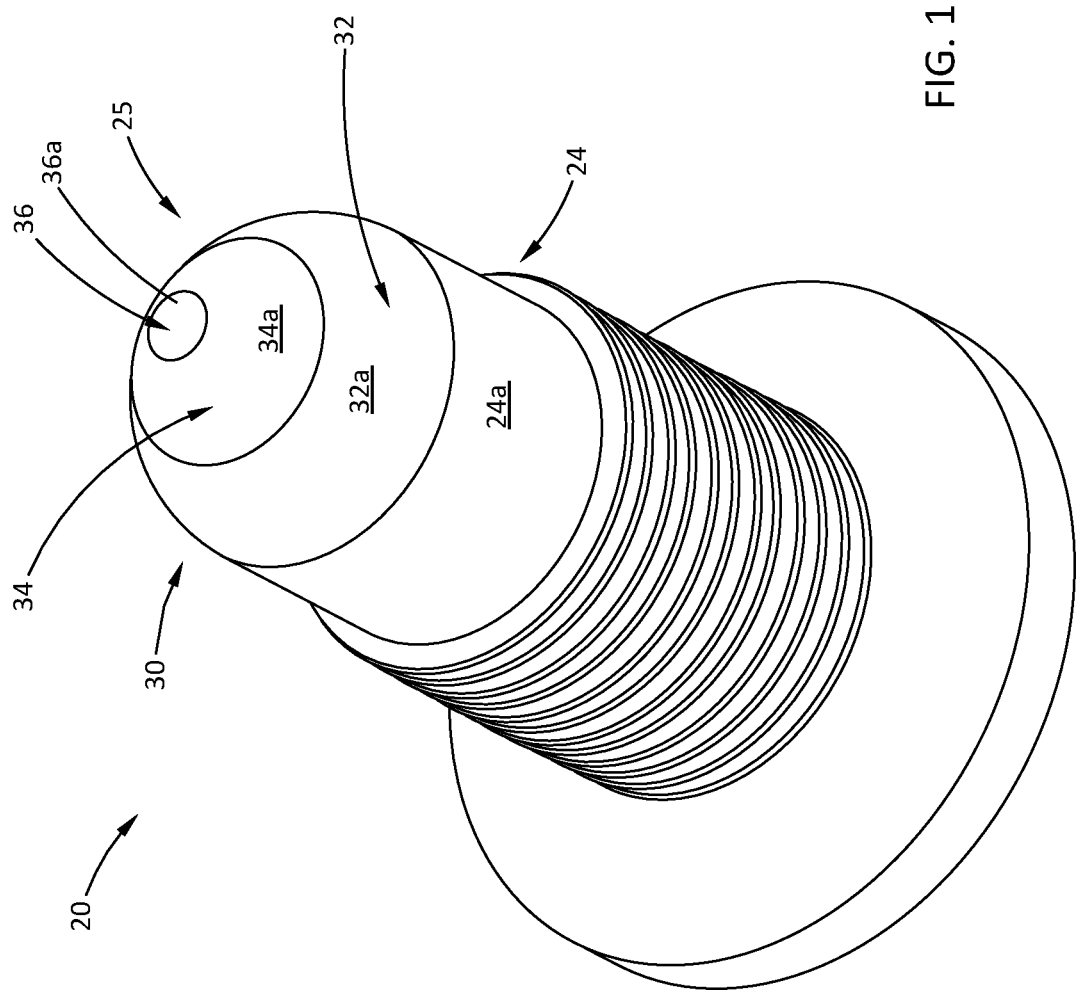
FIG. 1 is a bottom perspective view of a screw having a flow-hole-forming tip constructed according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
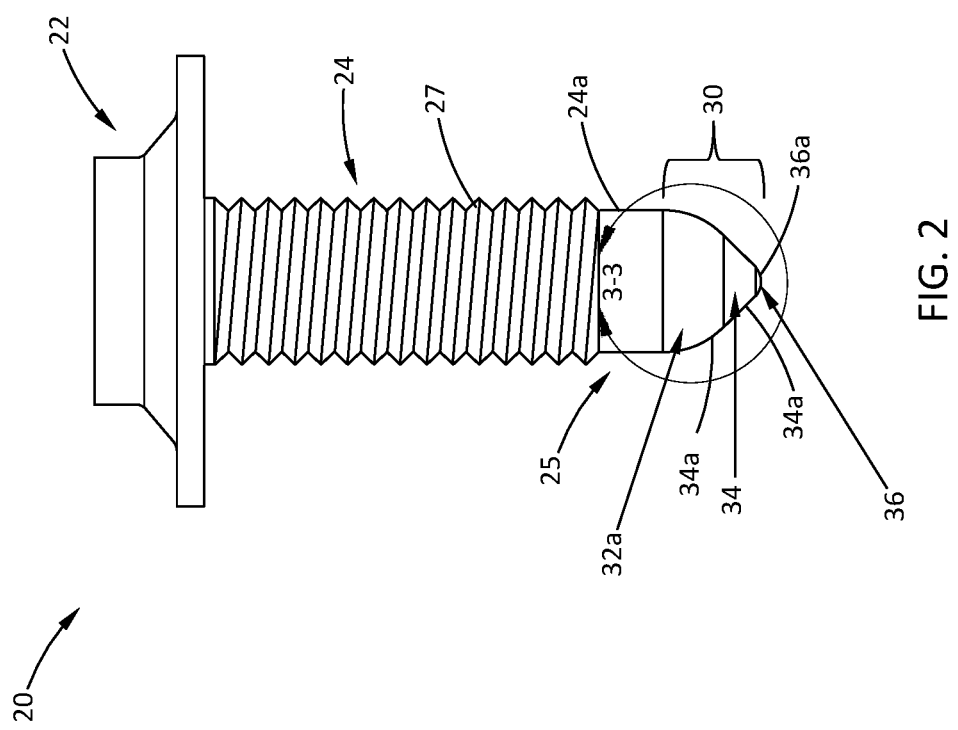
FIG. 2 is a side view of the screw of FIG. 1.

Referring to FIGS. 1 and 2, a screw according to the teachings of the present disclosure is illustrated and generally indicated by reference numeral 20. The screw 20 generally includes a head portion 22, an externally threaded shank 24 extending from the head portion 22, and a flow-hole-forming tip 30 disposed at a distal end portion 25 of the externally threaded shank 24. The externally threaded shank 24 also includes an external surface 24a. The screw 20 is an FDS type fastener and is used for flow drill screwing, the installation of which is set forth in greater detail below. It should be understood that the specific hex design of the head portion 22 illustrated is merely exemplary, and thus other head designs such as slotted or a Torx® style head portion, among other head features (e.g., washers, coatings, knurls), may be employed while remaining within the scope of the present disclosure. Further, the externally threaded shank 24 includes at least one threadform 27 that extends helically about the rotational axis of the screw 20 as shown. The threadform 27 may extend along a portion or the entire length of the externally threaded shank 24 and thus the illustrated threadform 27 should not be construed as limiting the scope of the present disclosure. In the example provided, a single threadform 27 is used (i.e., a single-helix). Additionally, different types and sizes of threadforms 27 may be employed, such as by way of example, multi-helix threads, while remaining within the scope of the present disclosure.

As further shown, the flow-hole-forming tip 30 comprises three (3) zones: 1) a radiused lower zone 32, which includes an exterior surface 32a; 2) a conical middle zone 34, which includes an exterior surface 34a; and 3) a radiused distal end zone 36, which includes an exterior surface 36a. The exterior surface 32a of the radiused lower zone 32 is tangent to the exterior surface 24a of the externally threaded shank 24, the exterior surface 34a of the conical middle zone 34 is tangent to the external surface 32a of the radiused lower zone 32, and the exterior surface 36a of the radiused distal end zone 36 is tangent to the exterior surface 34a of the conical middle zone 34.

The exterior surface 24a of the externally threaded shank 24 is a portion of the externally threaded shank 24 that lacks the threadform 27 and is axially disposed between the threadform 27 and the radiused lower zone 32. In one form, the exterior surface 24a is parallel to the rotational axis of the screw 20. In another form, the exterior surface 24a may be tapered such that it narrows as it approaches the radiused lower zone 32. The diameter of the exterior surface 24a may be less than or equal to the minimum diameter of the threadform 27.

In general, the flow-hole-forming tip 30 is specifically designed to penetrate castings, and more specifically castings formed from materials that are relatively brittle, such as aluminum (e.g., 7xxx series) or magnesium. It should be understood, however, that the innovative flow-hole-forming tip 30 can be used with other materials, and also with structures/workpieces that are formed with other manufacturing methods besides castings, such as by way of example, additive manufacturing, while remaining within the scope of the present disclosure.

Figure 3:
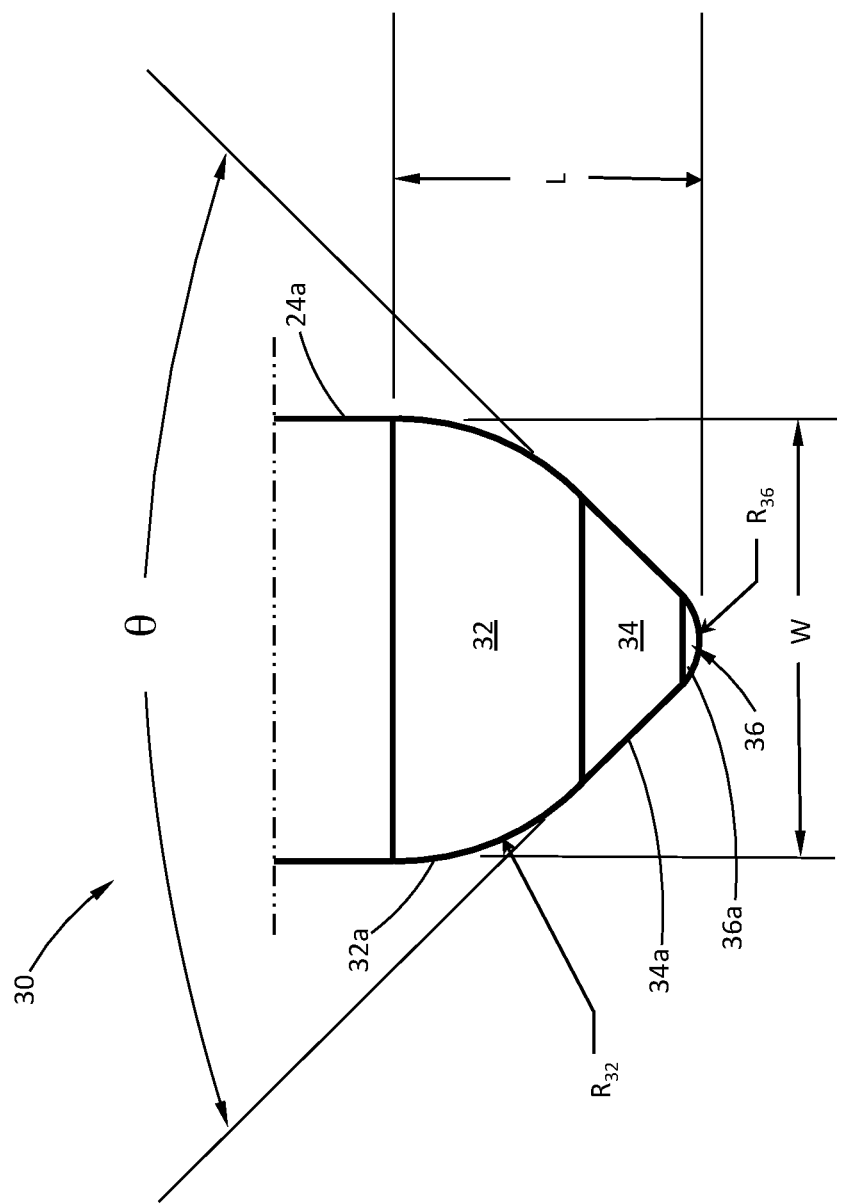
FIG. 3 is an enlarged detail view, taken from detail 3-3 of FIG. 2, of the flow-hole-forming tip of FIG. 1.

Referring now to FIG. 3, the flow-hole-forming tip 30 is further illustrated and now described in greater detail. As shown, the conical middle zone 34 defines a vertex angle θ as shown, which in one form is greater than or equal to 90 degrees. Accordingly, with such a large angle, the flow-hole-forming tip 30 is more blunt than conventional flow-hole-forming tips. In another form, a width W of the flow-hole-forming tip 30 is greater than a length L of the flow-hole-forming tip 30, which also provides for a more blunt flow-hole-forming tip 30. In one variation, the width W of the flow-hole-forming tip 30 is at least 1.25 times the length L of the flow-hole-forming tip 30. (i.e., W/L>=1.25)

In one form, the radiused distal end zone 36 defines a surface roughness (Ra) greater than a surface roughness of the radiused lower zone 32. This surface roughness provides micro features that can more easily penetrate workpieces (described in greater detail below) without the use of a defined cutting edge or a pinched tip as is known in the art. The surface roughness is generally between about 1 μm Ra and about 10 μm Ra. In one form, the Ra is about 5 μm Ra. Accordingly, the flow-hole-forming tip 30 according to the teachings herein does not include such a cutting edge as is used with prior art FDS type fasteners. Thus, the flow-hole-forming tip 30 generally defines a circular cross-section, taken perpendicular to the rotational axis, along its length L as shown.

In still another variation, a radius $R_{32}$ of the radiused lower zone 32 is at least 4 times greater than a radius $R_{36}$ of the radiused distal end zone 36. In one form, the radius $R_{36}$ of the radiused distal end zone 36 is about 0.5 mm. These features of the flow-hole-forming tip 30, namely, the vertex angle θ, the surface roughness, the W/L ratio, and the radius values/ratios may be used individually or in any combination according to the teachings herein to achieve a more blunt flow-hole-forming tip 30 that is more able to penetrate castings while creating a robust, higher quality joint.

In another form, the flow-hole-forming tip 30 comprises a friction coating applied to at least a portion thereof, such as by way of example, the radiused distal end zone 36. The friction coating may be applied to a portion of or over the entirety of one or more of the radiused distal end zone 36, the conical middle zone 34, and/or the radiused lower zone 32. Exemplary friction coatings include, but are not limited to, electroless nickel dispersion or ceramic coatings, among others.

Figure 4:
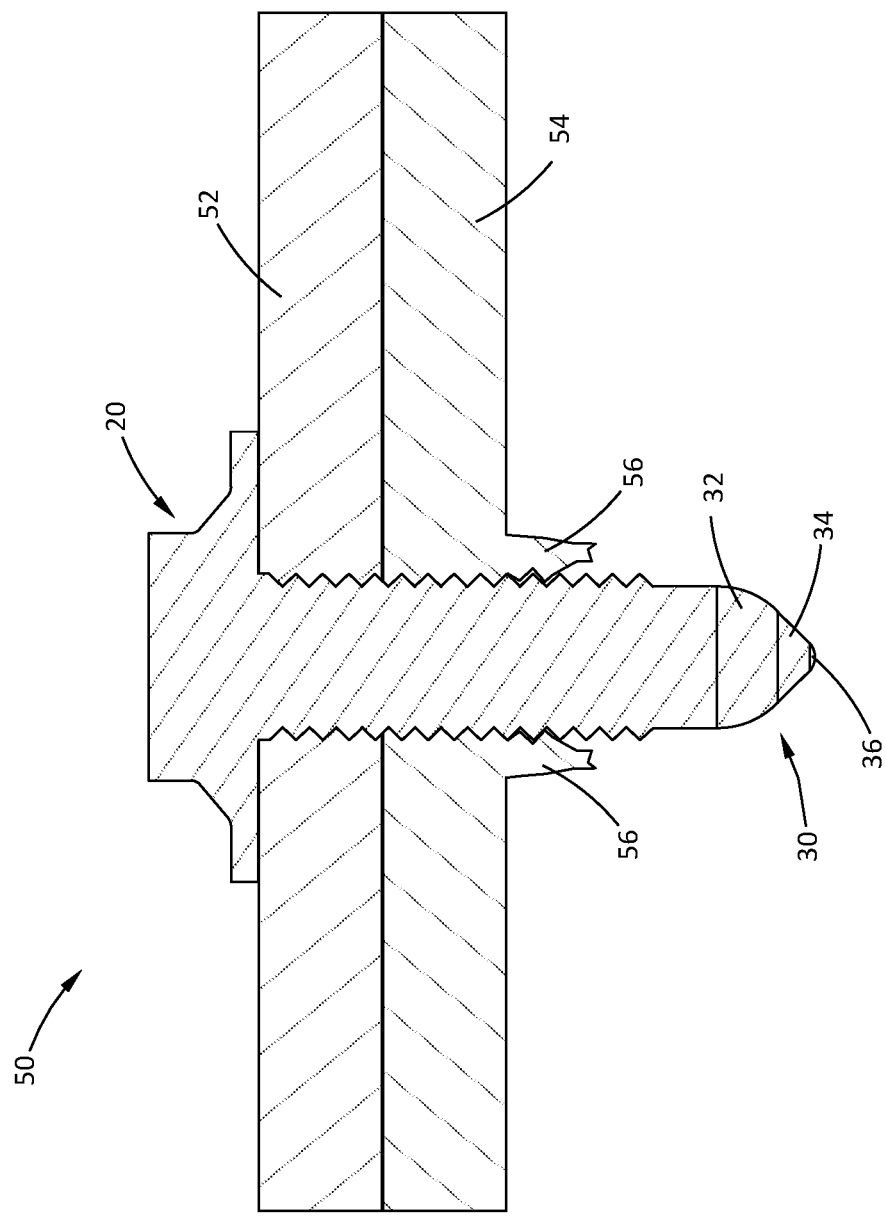
FIG. 4 is a side cross-sectional view of the screw of FIG. 1 installed into workpieces of a structural assembly according to the teachings of the present disclosure.

Referring now to FIG. 4, a structural assembly having the innovative screw 20 as set forth herein is illustrated and generally indicated by reference numeral 50. The structural assembly 50 includes a plurality of workpieces 52, 54, which are joined together by the screw 20. It should be understood that any number of workpieces (e.g., three or more) can be employed while remaining within the scope of the present disclosure. In one form, at least one of the workpieces 52, 54 is a casting, and more specifically the casting is an aluminum material or a magnesium material. In one form, the aluminum material is a 7xxx series aluminum.

The screw 20 can include any of the variations described above, and includes the flow-hole-forming tip 30 having the three (3) zones, namely, the radiused lower zone 32, the conical middle zone 34, and the radiused distal end zone 36. After the screw 20 is installed, a bushing 56 is formed in the lower workpiece 54 as shown. The bushing 56 is formed as the lower workpiece 54 is pierced and plastically deformed by the screw 20, and more specifically by the flow-hole-forming tip 30. Overall, the bushing 56 is of a higher quality with the use of the flow-hole-forming tip 30 according to the teachings herein, and especially when one or more of the workpieces 52, 54 are castings. It should be understood, however, that the teachings of the present disclosure are not limited to castings, and thus the screw 20 with the innovative flow-hole-forming tip 30 can be employed with a variety of parts/workpieces formed from other manufacturing methods, such as by way of example, additive manufacturing, machining, extruding, and stamping, among others.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A screw comprising:
    a head portion;
    an externally threaded shank extending from the head portion, the externally threaded shank having an external surface; and
    a flow-hole-forming tip disposed at a distal end portion of the externally threaded shank,
    wherein the flow-hole-forming tip comprises:
        a radiused lower zone having an external surface tangent to the external surface of the externally threaded shank;
        a conical middle zone having an external surface tangent to the external surface of the radiused lower zone, the conical middle zone defining a vertex angle; and
        a radiused distal end zone having an external surface tangent to the external surface of the conical middle zone,
    wherein the flow-hole-forming tip comprises at least one of:
        a width of the flow-hole-forming tip is greater than a length of the flow-hole-forming tip; and
        the vertex angle is greater than or equal to 90 degrees.

2. The screw according to claim 1, wherein the radiused distal end zone has a radius of about 0.5 mm.

3. The screw according to claim 1, wherein the width of the flow-hole-forming tip is at least 1.25 times the length of the flow-hole-forming tip.

4. The screw according to claim 1, wherein a radius of the radiused lower zone is at least 4 times greater than a radius of the radiused distal end zone.

5. The screw according to claim 1, wherein the flow-hole-forming tip does not include a cutting edge.

6. The screw according to claim 1, wherein the radiused distal end zone defines a surface roughness (Ra) greater than a surface roughness of the radiused lower zone.

7. The screw according to claim 1, wherein the externally threaded shank comprises multi-helix threads.

8. The screw according to claim 1, wherein the flow-hole-forming tip further comprises a friction coating.

9. A screw comprising:
    a head portion;
    an externally threaded shank extending from the head portion, the externally threaded shank having an external surface; and
    a flow-hole-forming tip disposed at a distal end portion of the externally threaded shank,
    wherein the flow-hole-forming tip comprises:
        a radiused lower zone having an external surface tangent to the external surface of the externally threaded shank;
        a conical middle zone having an external surface tangent to the external surface of the radiused lower zone, the conical middle zone defining a vertex angle greater than or equal to 90 degrees; and
        a radiused distal end zone having an external surface tangent to the external surface of the conical middle zone.

10. The screw according to claim 9, wherein the radiused distal end zone defines a surface roughness (Ra) greater than a surface roughness of the radiused lower zone.

11. The screw according to claim 9, wherein a width of the flow-hole-forming tip is greater than a length of the flow-hole-forming tip.

12. The screw according to claim 9, wherein the flow-hole-forming tip does not include a cutting edge.

13. A structural assembly comprising:
    a plurality of workpieces, at least one of the workpieces comprising a casting;
    a screw disposed between the plurality of workpieces, the screw comprising:
        a head portion;
        an externally threaded shank extending from the head portion, the externally threaded shank having an external surface; and
        a flow-hole-forming tip disposed at a distal end portion of the externally threaded shank,
    wherein the flow-hole-forming tip comprises:
        a radiused lower zone having an external surface tangent to the external surface of the externally threaded shank;
        a conical middle zone having an external surface tangent to the external surface of the radiused lower zone, the conical middle zone defining a vertex angle greater than or equal to 90 degrees; and
        a radiused distal end zone having an external surface tangent to the external surface of the conical middle zone.

14. The structural assembly according to claim 13, wherein the casting is one of an aluminum material or a magnesium material.

15. The structural assembly according to claim 14, wherein the casting is a 7xxx series aluminum material.

16. The structural assembly according to claim 13, wherein a width of the flow-hole-forming tip is greater than a length of the flow-hole-forming tip, and the width of the flow-hole-forming tip is at least 1.25 times the length of the flow-hole-forming tip.

17. The structural assembly according to claim 13, wherein a radius of the radiused lower zone is at least 4 times greater than a radius of the radiused distal end zone.

18. The structural assembly according to claim 13, wherein the flow-hole-forming tip does not include a cutting edge.

19. The structural assembly according to claim 13, wherein the radiused distal end zone defines a surface roughness (Ra) greater than a surface roughness of the radiused lower zone.

20. The screw according to claim 13, wherein the flow-hole-forming tip further comprises a friction coating.

* * * * *